(12) United States Patent
Porat et al.

(10) Patent No.: US 7,724,639 B1
(45) Date of Patent: May 25, 2010

(54) METHOD OF BIT ALLOCATION IN A MULTICARRIER SYMBOL TO ACHIEVE NON-PERIODIC FREQUENCY DIVERSITY

(75) Inventors: Ron Porat, La Jolla, CA (US); Anton Monk, San Diego, CA (US)

(73) Assignee: Entropic Communications, Inc., San Diego, CA (US)

( * ) Notice: Subject to any disclaimer, the term of this patent is extended or adjusted under 35 U.S.C. 154(b) by 1124 days.

(21) Appl. No.: 10/734,535

(22) Filed: Dec. 11, 2003

Related U.S. Application Data (60) Provisional application No. 60/432,732, filed on Dec. 12, 2002.

(51) Int. Cl.
 H04J 11/00 (2006.01)
 H04B 7/208 (2006.01)
 H04K 1/10 (2006.01)
(52) U.S. Cl. .................. 370/208; 370/344; 375/260
(58) Field of Classification Search ......... 370/203–208, 370/344, 320, 343, 347, 281, 295, 216–228, 370/480; 375/260
See application file for complete search history.

(56) References Cited

U.S. PATENT DOCUMENTS

| | | | | |
|---|---|---|---|---|
| 6,151,296 A * | 11/2000 | Vijayan et al. | ............... | 370/208 |
| 6,304,611 B1 * | 10/2001 | Miyashita et al. | ........... | 375/260 |
| 6,351,473 B1 * | 2/2002 | Reusens et al. | ............. | 370/480 |
| 6,487,252 B1 * | 11/2002 | Kleider et al. | ............... | 375/260 |
| 6,751,262 B1 * | 6/2004 | Tager | .......................... | 375/260 |
| 6,810,006 B2 * | 10/2004 | Michon et al. | ............... | 370/203 |
| 7,058,005 B2 * | 6/2006 | Ehrmann-Patin et al. | ..... | 370/208 |
| 7,095,709 B2 * | 8/2006 | Walton et al. | ................ | 370/208 |
| 7,158,475 B1 * | 1/2007 | Ikeda et al. | .................. | 370/208 |
| 7,173,979 B1 * | 2/2007 | Badri et al. | .................. | 375/308 |
| 7,206,350 B2 * | 4/2007 | Korobkov et al. | ........... | 375/260 |
| 7,301,890 B2 * | 11/2007 | Joo et al. | ..................... | 370/208 |
| 7,301,892 B2 * | 11/2007 | Shen et al. | ................... | 370/209 |
| 7,302,023 B2 * | 11/2007 | Yang | .......................... | 375/346 |
| 2001/0033623 A1 * | 10/2001 | Hosur | ........................ | 375/267 |
| 2002/0085641 A1 * | 7/2002 | Baum | ......................... | 375/260 |
| 2002/0154705 A1 * | 10/2002 | Walton et al. | ............... | 375/267 |
| 2002/0172184 A1 * | 11/2002 | Kim et al. | .................... | 370/344 |
| 2003/0147655 A1 * | 8/2003 | Shattil | ........................ | 398/182 |
| 2004/0190637 A1 * | 9/2004 | Maltsev et al. | .............. | 375/260 |

* cited by examiner

*Primary Examiner*—Steven H Nguyen
*Assistant Examiner*—Candal Elpenord
(74) *Attorney, Agent, or Firm*—Bruce W. Greenhaus (57) ABSTRACT

In an orthogonal frequency division multiplex (OFDM) communication system, data bits are assigned to several carriers to create frequency redundancy in the transmitted waveform. Uniformly spaced carriers occupy the frequency band of the OFDM signal. Multipath nulls caused by reflections of the transmitted signal can occur at periodic frequency intervals, for example in a coaxial cable. A non-periodic pattern of bit allocation to carriers creates frequency diversity that is resistant to periodic multipath nulls existing in the communication channel.

2 Claims, 4 Drawing Sheets

Fig. 1

Bit values transmitted in bins

| | | | | | | | | | | | | | | | | Bins |
|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 0 to 15 |
| 15 | 0 | 1 | 2 | 3 | 4 | 5 | 6 | 7 | 8 | 9 | 10 | 11 | 12 | 13 | 14 | 16 to 31 |
| 13 | 14 | 15 | 0 | 1 | 2 | 3 | 4 | 5 | 6 | 7 | 8 | 9 | 10 | 11 | 12 | 32 to 47 |
| 10 | 11 | 12 | 13 | 14 | 15 | 0 | 1 | 2 | 3 | 4 | 5 | 6 | 7 | 8 | 9 | 48 to 63 |
| 6 | 7 | 8 | 9 | 10 | 11 | 12 | 13 | 14 | 15 | 0 | 1 | 2 | 3 | 4 | 5 | 64 to 79 |
| 1 | 2 | 3 | 4 | 5 | 6 | 7 | 8 | 9 | 10 | 11 | 12 | 13 | 14 | 15 | 0 | 80 to 95 |
| 11 | 12 | 13 | 14 | 15 | 0 | 1 | 2 | 3 | 4 | 5 | 6 | 7 | 8 | 9 | 10 | 96 to 111 |
| 4 | 5 | 6 | 7 | 8 | 9 | 10 | 11 | 12 | 13 | 14 | 15 | 0 | 1 | 2 | 3 | 112 to 127 |
| 12 | 13 | 14 | 15 | 0 | 1 | 2 | 3 | 4 | 5 | 6 | 7 | 8 | 9 | 10 | 11 | 128 to 143 |
| 3 | 4 | 5 | 6 | 7 | 8 | 9 | 10 | 11 | 12 | 13 | 14 | 15 | 0 | 1 | 2 | 144 to 159 |
| 9 | 10 | 11 | 12 | 13 | 14 | 15 | 0 | 1 | 2 | 3 | 4 | 5 | 6 | 7 | 8 | 160 to 175 |
| 14 | 15 | 0 | 1 | 2 | 3 | 4 | 5 | 6 | 7 | 8 | 9 | 10 | 11 | 12 | 13 | 176 to 191 |
| 2 | 3 | 4 | 5 | 6 | 7 | 8 | 9 | 10 | 11 | 12 | 13 | 14 | 15 | 0 | 1 | 192 to 207 |
| 5 | 6 | 7 | 8 | 9 | 10 | 11 | 12 | 13 | 14 | 15 | 0 | 1 | 2 | 3 | 4 | 208 to 223 |
| 7 | 8 | 9 | 10 | 11 | 12 | 13 | 14 | 15 | 0 | 1 | 2 | 3 | 4 | 5 | 6 | 224 to 239 |
| 8 | 9 | 10 | 11 | 12 | 13 | 14 | 15 | 0 | 1 | 2 | 3 | 4 | 5 | 6 | 7 | 240 to 255 |

METHOD OF BIT ALLOCATION IN A MULTICARRIER SYMBOL TO ACHIEVE NON-PERIODIC FREQUENCY DIVERSITY

RELATED APPLICATIONS

This application claims priority to U.S. provisional patent application Ser. No. 60/432,732 filed Dec. 12, 2002 entitled "Method of bit allocation in a multicarrier symbol to achieve non-periodic frequency diversity".

FIELD OF THE INVENTION

1. Background

This invention relates to orthogonal frequency division multiplex data transmission and specifically to avoiding to the effects of deep multipath nulls.

2. Prior Art

Multicarrier communications is a well known modulation type that enables overcoming certain channel impairments. Some applications require very robust communication, even at the expense of data throughput. One example is the process of establishing communication between nodes of a network, where the amount of data transferred is modest and the requirement for reliability is high. Messages must be exchanged to allow access to the network, make channel assignments, and determine the modulation waveform used for traffic data. Multipath conditions present in some communication channels creates frequency selective impairments that degrade signal quality. Interference is another source of impairment. Robust communication is needed to overcome these impairments.

Various techniques are used to achieve robust communications. High transmission power levels can be used, but this can cause interference, excessive power consumption, and impose challenging design constraints. Error correction coding can be used to improve the error rate, but requires a basic signal to be acquired first at an correctable error rate. In some cases the impairments to the channel are so great that a signal can not be acquired or corrected. One example of a robust signaling technique is frequency diversity, where the signal is transmitted at two different frequencies. If frequency selective impairments degrade one signal the other signal, or the combination of the two, may still be adequate for reception. Ojard, U.S. Pat. No. 6,327,311 entitled "Frequency diverse single carrier modulation for robust communication over in-premises wiring" discloses the use of frequency diversity for a single carrier frequency QAM signal. The QAM signal is transmitted using two identical signals transmitted at adjacent carrier frequencies.

The communication channel created by coaxial cable is characterized by multipath that can produce periodic nulls across a frequency band. The nulls impair signal to noise ratio in the effected area. A deep null may completely cancel the signal at certain frequencies. Null depth can be 20 dB or more. The frequency spacing of the nulls depends on the time delay between the signals arriving at the receiver. The most harmful scenario is a two-path multipath, which results in deep nulls at periodic frequency intervals.

Figure 1:
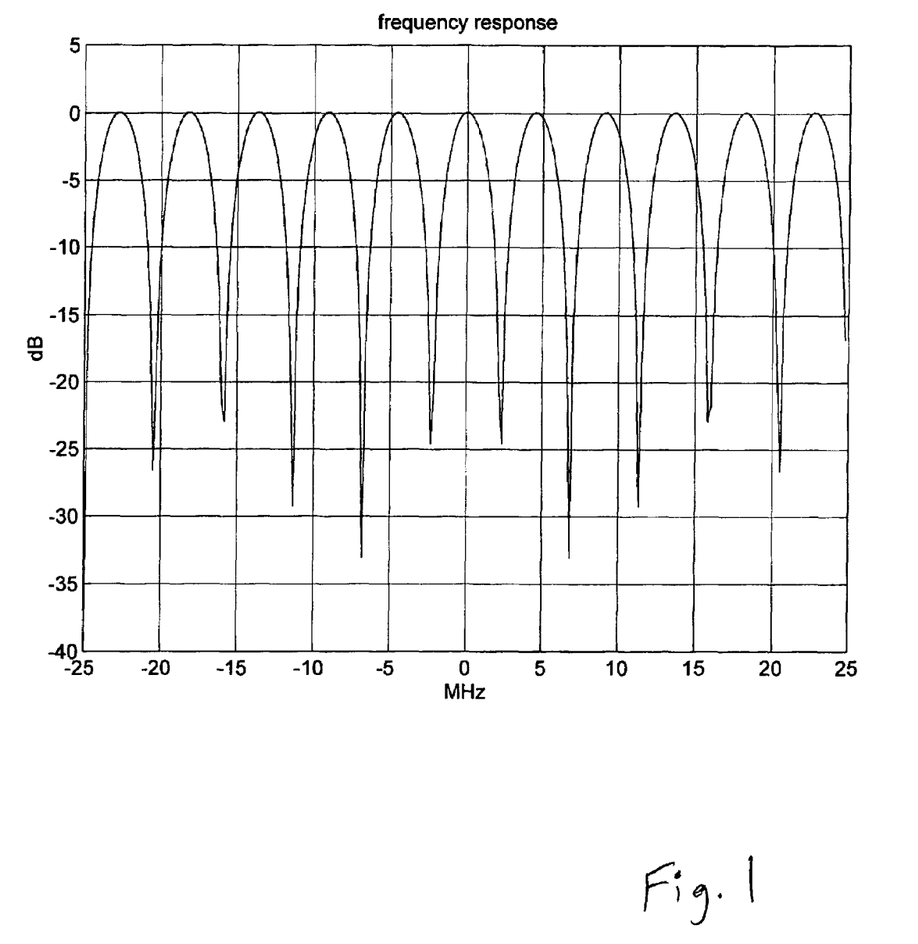
FIG. 1 shows a representative channel response with multipath.
Figure 2:
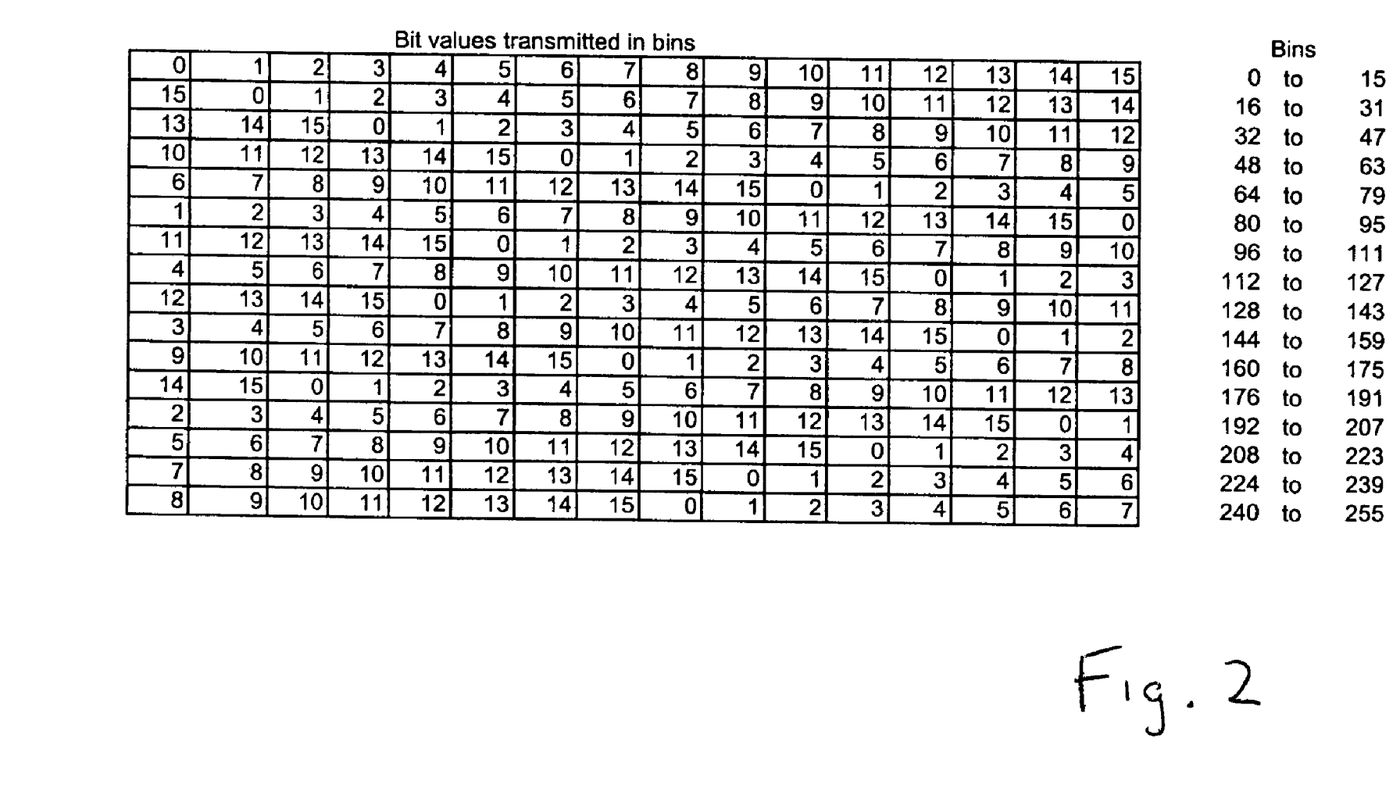
FIG. 2 shows bits assigned to a multicarrier symbol for 16-way frequency diversity.

FIG. 1 plots a 50 MHz wide channel with multipath where two signals arrive at the receiver with a time displacement, having propagating through different paths. Carriers located at the nulls in the channel response will be impaired and possibly useless. The following Matlab code generates the plot shown in FIG. 1:

b=[1 zeros(1,10) 1]; % impulse response of channel

[h,f]=freqz(b,1,256,'whole',50); % create frequency response h1=abs(h)/max(abs(h)); % normalize values to peak plot(f−25,20*log 10(fftshift(h1+1e−2))),grid % plot log response title('frequency response') % label plot ylabel('dB')

xlabel('MHz')

The array b represents the impulse response of channel with two-path multipath of equal amplitude. The first and last array element values are 1 and represent impulses occurring with a time displacement modeled by the zeros between the impulses. The time displacement is unknown for a given channel, until measured. Changing the impulse spacing changes the interval in the frequency domain of the channel response nulls. The function freqz( ) compute the frequency domain response of the channel represented by the time domain response in array b.

Among the techniques to compensate for multipath nulls is equalization, where a receive filter with a response inverse to the channel is used to boost the signal in areas where it is weak. This approach has limitations, because it requires knowing the channel response. Without probing the channel, the exact position and depth of the nulls is not known. Adaptive equalizers employed in the receiver require training and time to converge and are not suitable for a burst packet communication system. Additionally, when the null is deep, the SNR is degraded to the point that no data can be recovered. An equalizer alone is not sufficient to overcome degradation from deep nulls.

Multicarrier modulation codes bits on a number of carriers that are transmitted as one symbol. A multicarrier signal transmits many carriers, each carrier independently modulated with a portion of transmitted data. Bit loading can be used to increase the order of modulation and thus bit rate of carriers where the SNR is high, and lowering the order of modulation and bit rate of carriers where the SNR is low. At some frequencies the SNR is so low that no useable data be received in a particular carrier. The data transmitted by these carriers is lost.

OFDM is one approach to multicarrier modulation and is well known. When applied to a channel experiencing multipath nulls, individual carriers are degraded or lost, preventing recovery of data from those carriers. Frequency diversity is known whereby the same bit is transmitted on several carriers to insure against loss of any particular carrier. The receiver selects or combines the signal received from each of the carriers transmitting the same bit. To have a robust signal there must be certainty that the frequency diversity pattern does not correlate with the null pattern, otherwise all of the carriers associated with a bit could be lost. Since the null spacing is not known, any periodic frequency diversity pattern has the potential to lose all the copies of a bit replicated across multiple carriers.

Seki, et al, "A study of OFDM system applying F[r]equency Diversity" The 11th IEEE International Symposium on Personal, Indoor and Mobile Radio Communications, 2000. vol. 2, pp. 1385-1389, 18-21 Sep. 2000 London, UK 2000 ISBN: 0-7803-6463-5, IEEE Catalog Number: 00TH8525 discloses frequency diversity in OFDM systems using two approaches: adaptive mapping and quasi-random mapping. An adaptive mapping approach requires additional traffic to exchange channel information. The channel seen by each receiver is different, so this approach is not effective for broadcast messages. A random channel mapping does not insure the mapping avoids periodic intervals of nulls that may be present in the channel. This reference does not disclose a specific quasi-random channel mapping.

U.S. Pat. No. 6,473,418 to Laroia, et al., "Orthogonal frequency division multiplexing based spread spectrum multiple access", incorporated herein by reference, discloses frequency diversity by frequency hopping a user from one tone to another. This approach requires synchronization between the sending and receiving device.

U.S. Pat. No. 6,278,685 to Yonge, III, et al. "Robust transmission mode", incorporated herein by reference, discloses an interleaving scheme to create redundancy in time and frequency diversity by storing data in an interleaver memory and reading multiple copies of the data from the interleaver memory to create copies spread among non-consecutive symbols and spread among non-adjacent carriers. This technique is intended to be used with error correction coding, where the interleaving spreads burst errors across several symbols so the coding is effective for correcting errors. The interleaver introduces a delay in data transmission. The number of symbols required to transmit data is a function of the interleaver depth. A long interleaving depth is not possible with short messages, thus limited the improvement possible with this approach.

The degree of frequency diversity can range from 2 up to the total number of carriers. The greater the number of replicated carriers the greater the immunity to multipath nulls, but data throughput is reduced. There is a need not addressed in the prior art for a frequency diversity approach which addresses the periodic deep null condition created by a strong two path multipath channel.

SUMMARY OF THE INVENTION

The present invention uses a class of non-periodic patterns to allocate bits to achieve frequency diversity in a multicarrier symbol. Non-periodic bit allocation insures that periodic nulls will not impair all copies of a bit within the multicarrier symbol. The preferred modulation is BPSK and the technique may be employed with other modulation orders. A robust signal is created that does not require channel estimation.

As the degree of repetition increases, the robustness of the signal is increased. It is preferred to use 4, 8 or 16-way frequency diversity.

This invention provides a method to trade off throughput with robustness. The exact pattern of carriers used can be designed to combat different multipath scenarios and can be changed as necessary. A fixed repetition pattern can be used by the transmitter or the transmitter can select from a predetermined set of repetition patterns. The receiver attempts to receive the signal using one of the set of repetition patterns until a recognizable signal is found.

Selected subcarrier frequencies may be avoided where known interference is present by setting the transmitted subcarriers to zero power level.

Error correction coding can be applied to the transmitted messages and used to correct errors in the received message.

The receiver applies carrier selecting or combining techniques to exploit the redundancy of the signal. These techniques include observing the signal to noise ratio (SNR) of all carriers and selecting the carrier with the highest SNR from which to extract data. Another approach is to sum the received signal from each carrier transmitting identical data. The summation of carrier signals can be done on hard bit decisions or soft amplitude quantizing. The summation can use a weighting function applied to each carrier or use uniform weighting.

The robust signal can be used to transmit information between nodes before the channel conditions are known. Messages exchanged using the robust signaling include network access, synchronization, channel probes, bit loading array, and echo profile probe for determining multipath.

DETAILED DESCRIPTION OF THE INVENTION

In an exemplary embodiment, 256 carrier tones are used for each multicarrier symbol. Each tone is modulated with BPSK to utilize the most robust modulation with the least amount of power. QPSK or higher modulation orders could be use. Data is repeated a predetermined number of times in several carriers across the frequency band. Preferred repetition factors are 8 to 16.

A message length, for example, of 156 bits with a repetition factor 8 would use 5 OFDM symbols. A message of 156 bits with a repetition factor of 16 would use 10 OFDM symbols. Message preamble bits are used in addition to user data bits to establish automatic gain control (AGC) levels and to estimate carrier offset and symbol timing.

The repetition pattern distributes the redundant data across carriers in a pseudorandom pattern that insures non-periodicity in the location of carriers modulated by the same data bit.

For example, in an OFDM symbol with 256 carriers and 16-way diversity, the optimal bit assignment is to assign redundant bit so that the interval between carriers for each of the 16 bin assignments is different. The following Matlab code implements one such option:

```
% Matlab Code to generate bin assignment table
% 16 way diversity
bins=256; % number of carriers in OFDM
bitspersym=16; % number of bits per OFDM symbol
r=16; % redundancy factor, number of bins each bit occupies
dif=1; % stepping increment
a=bitspersym*(0:r-1); % generate boundaries for each group of bins
b=1:dif:bitspersym-1; % generate gap between positions
p=ones(bitspersym, r); % create matrix to hold bin positions
for i=0:bitspersym-1; % loop number of bits
   c=[i i+cumsum(b)]; % actual positions by cumulative sum b
   d=rem(c,bitspersym); % modulus wraps numbers within group range
   p(i+1, :)=d+a; % add group boundaries to bin position
   % p is resulting array of bin assignments for each bit
end
```

Explanation of the Code:

Line 1 generates the boundaries of each of the 16 groups.

Line 2 generates the gap between the positions within each group of any of the 16 bits.

Line 3 generates just a 16 by 16 matrix that will hold the exact positions of each bit in each group Lines 4-8 are a loop on the number of bits. Each iteration generates the positions of the next bit and stores them in the next row.

Line 5 generates the actual positions for each bit by summing up the values of b.

The Matlab function used in the process is cumsum (cumulative sum). An example of its output is cumsum([1 2 3 4])=[1 3 6 10].

Thus, since b was the gap between the indices cumsum(b) is the actual position and the starting position is incremented by 1 each new bit.

Line 6 reduces the actual positions to within a group i.e. modulo 16

Line 7 adds the boundaries to d

The resulting diversity pattern is shown in Table 1 below where each row contains the indices of bin numbers used to modulate the data bit identified in the bit number column. The symbol is composed of 256 adjacent carriers identified with the range 0 to 255. Bin 0 is the lowest frequency bin and bin 255 is the highest frequency bin.

TABLE 1

Bin Number Assignment for 16 way Frequency Diversity

| Bit Number | Bin Number | | | | | | | | | | | | | | | |
| --- | --- | --- | --- | --- | --- | --- | --- | --- | --- | --- | --- | --- | --- | --- | --- | --- |
| 0  | 0  | 17 | 35 | 54 | 74 | 95 | 101 | 124 | 132 | 157 | 167 | 178 | 206 | 219 | 233 | 248 |
| 1  | 1  | 18 | 36 | 55 | 75 | 80 | 102 | 125 | 133 | 158 | 168 | 179 | 207 | 220 | 234 | 249 |
| 2  | 2  | 19 | 37 | 56 | 76 | 81 | 103 | 126 | 134 | 159 | 169 | 180 | 192 | 221 | 235 | 250 |
| 3  | 3  | 20 | 38 | 57 | 77 | 82 | 104 | 127 | 135 | 144 | 170 | 181 | 193 | 222 | 236 | 251 |
| 4  | 4  | 21 | 39 | 58 | 78 | 83 | 105 | 112 | 136 | 145 | 171 | 182 | 194 | 223 | 237 | 252 |
| 5  | 5  | 22 | 40 | 59 | 79 | 84 | 106 | 113 | 137 | 146 | 172 | 183 | 195 | 208 | 238 | 253 |
| 6  | 6  | 23 | 41 | 60 | 64 | 85 | 107 | 114 | 138 | 147 | 173 | 184 | 196 | 209 | 239 | 254 |
| 7  | 7  | 24 | 42 | 61 | 65 | 86 | 108 | 115 | 139 | 148 | 174 | 185 | 197 | 210 | 224 | 255 |
| 8  | 8  | 25 | 43 | 62 | 66 | 87 | 109 | 116 | 140 | 149 | 175 | 186 | 198 | 211 | 225 | 240 |
| 9  | 9  | 26 | 44 | 63 | 67 | 88 | 110 | 117 | 141 | 150 | 160 | 187 | 199 | 212 | 226 | 241 |
| 10 | 10 | 27 | 45 | 48 | 68 | 89 | 111 | 118 | 142 | 151 | 161 | 188 | 200 | 213 | 227 | 242 |
| 11 | 11 | 28 | 46 | 49 | 69 | 90 | 96  | 119 | 143 | 152 | 162 | 189 | 201 | 214 | 228 | 243 |
| 12 | 12 | 29 | 47 | 50 | 70 | 91 | 97  | 120 | 128 | 153 | 163 | 190 | 202 | 215 | 229 | 244 |
| 13 | 13 | 30 | 32 | 51 | 71 | 92 | 98  | 121 | 129 | 154 | 164 | 191 | 203 | 216 | 230 | 245 |
| 14 | 14 | 31 | 33 | 52 | 72 | 93 | 99  | 122 | 130 | 155 | 165 | 176 | 204 | 217 | 231 | 246 |
| 15 | 15 | 16 | 34 | 53 | 73 | 94 | 100 | 123 | 131 | 156 | 166 | 177 | 205 | 218 | 232 | 247 |

Table 2 shows the frequency gap between the diversity bins for each bit.

TABLE 2

Frequency Spacing of Bit allocation for 16 way Frequency Diversity

| Bit Number | Spacing between bin assignments | | | | | | | | | | | | | | |
| --- | --- | --- | --- | --- | --- | --- | --- | --- | --- | --- | --- | --- | --- | --- | --- |
| 0  | 17 | 18 | 19 | 20 | 21 | 6  | 23 | 8  | 25 | 10 | 11 | 28 | 13 | 14 | 15 |
| 1  | 17 | 18 | 19 | 20 | 5  | 22 | 23 | 8  | 25 | 10 | 11 | 28 | 13 | 14 | 15 |
| 2  | 17 | 18 | 19 | 20 | 5  | 22 | 23 | 8  | 25 | 10 | 11 | 12 | 29 | 14 | 15 |
| 3  | 17 | 18 | 19 | 20 | 5  | 22 | 23 | 8  | 9  | 26 | 11 | 12 | 29 | 14 | 15 |
| 4  | 17 | 18 | 19 | 20 | 5  | 22 | 7  | 24 | 9  | 26 | 11 | 12 | 29 | 14 | 15 |
| 5  | 17 | 18 | 19 | 20 | 5  | 22 | 7  | 24 | 9  | 26 | 11 | 12 | 13 | 30 | 15 |
| 6  | 17 | 18 | 19 | 4  | 21 | 22 | 7  | 24 | 9  | 26 | 11 | 12 | 13 | 30 | 15 |
| 7  | 17 | 18 | 19 | 4  | 21 | 22 | 7  | 24 | 9  | 26 | 11 | 12 | 13 | 14 | 31 |
| 8  | 17 | 18 | 19 | 4  | 21 | 22 | 7  | 24 | 9  | 26 | 11 | 12 | 13 | 14 | 15 |
| 9  | 17 | 18 | 19 | 4  | 21 | 22 | 7  | 24 | 9  | 10 | 27 | 12 | 13 | 14 | 15 |
| 10 | 17 | 18 | 3  | 20 | 21 | 22 | 7  | 24 | 9  | 10 | 27 | 12 | 13 | 14 | 15 |
| 11 | 17 | 18 | 3  | 20 | 21 | 6  | 23 | 24 | 9  | 10 | 27 | 12 | 13 | 14 | 15 |
| 12 | 17 | 18 | 3  | 20 | 21 | 6  | 23 | 8  | 25 | 10 | 27 | 12 | 13 | 14 | 15 |
| 13 | 17 | 2  | 19 | 20 | 21 | 6  | 23 | 8  | 25 | 10 | 27 | 12 | 13 | 14 | 15 |
| 14 | 17 | 2  | 19 | 20 | 21 | 6  | 23 | 8  | 25 | 10 | 11 | 28 | 13 | 14 | 15 |
| 15 | 1  | 18 | 19 | 20 | 21 | 6  | 23 | 8  | 25 | 10 | 11 | 28 | 13 | 14 | 15 |

Each bit occupies bins with gaps varying between 1 and 31. The gap interval is different between each of the bin assignments.

Diversity 8 pattern is designed in much the same way using this code:

```
% Matlab Code to generate bin assignment table
% 8 way diversity
bins=256; % number of carriers in OFDM
bitspersym=32; % number of bits per OFDM symbol
r=8; % redundancy factor, number of bins each bit occupies
dif=5; % stepping increment
a=bitspersym*(0:r−1); % generate boundaries for each group of bins
b=1:dif:bitspersym−1; % generate gap between positions
p=ones(bitspersym, r); % create matrix to hold bin positions
for i=0:bitspersym−1; % loop number of bits
    c=[i i+cumsum(b)]; % actual positions by cumulative sum b
    d=rem(c,bitspersym); % modulus wraps numbers within group range
    p(i+1, :)=d+a; % add group boundaries to bin position
    % p is resulting array of bin assignments for each bit
end
```

The parameter dif is a stepping increment used when creating the gaps between bit assignments and is set to 5 in this example. This is a variable value and operates as a seed number used to give a particular sequence of bin assignments. The parameter dif can be assigned any value.

This yields the allocation pattern shown in Table 3.

TABLE 3

Bit assignment for 8 way frequency diversity

| Bit Number | Bin Number | | | | | | | |
|---|---|---|---|---|---|---|---|---|
| 0 | 0 | 33 | 71 | 114 | 130 | 183 | 209 | 240 |
| 1 | 1 | 34 | 72 | 115 | 131 | 184 | 210 | 241 |
| 2 | 2 | 35 | 73 | 116 | 132 | 185 | 211 | 242 |
| 3 | 3 | 36 | 74 | 117 | 133 | 186 | 212 | 243 |
| 4 | 4 | 37 | 75 | 118 | 134 | 187 | 213 | 244 |
| 5 | 5 | 38 | 76 | 119 | 135 | 188 | 214 | 245 |
| 6 | 6 | 39 | 77 | 120 | 136 | 189 | 215 | 246 |
| 7 | 7 | 40 | 78 | 121 | 137 | 190 | 216 | 247 |
| 8 | 8 | 41 | 79 | 122 | 138 | 191 | 217 | 248 |
| 9 | 9 | 42 | 80 | 123 | 139 | 160 | 218 | 249 |
| 10 | 10 | 43 | 81 | 124 | 140 | 161 | 219 | 250 |
| 11 | 11 | 44 | 82 | 125 | 141 | 162 | 220 | 251 |
| 12 | 12 | 45 | 83 | 126 | 142 | 163 | 221 | 252 |
| 13 | 13 | 46 | 84 | 127 | 143 | 164 | 222 | 253 |
| 14 | 14 | 47 | 85 | 96 | 144 | 165 | 223 | 254 |
| 15 | 15 | 48 | 86 | 97 | 145 | 166 | 192 | 255 |
| 16 | 16 | 49 | 87 | 98 | 146 | 167 | 193 | 224 |
| 17 | 17 | 50 | 88 | 99 | 147 | 168 | 194 | 225 |
| 18 | 18 | 51 | 89 | 100 | 148 | 169 | 195 | 226 |
| 19 | 19 | 52 | 90 | 101 | 149 | 170 | 196 | 227 |
| 20 | 20 | 53 | 91 | 102 | 150 | 171 | 197 | 228 |
| 21 | 21 | 54 | 92 | 103 | 151 | 172 | 198 | 229 |
| 22 | 22 | 55 | 93 | 104 | 152 | 173 | 199 | 230 |
| 23 | 23 | 56 | 94 | 105 | 153 | 174 | 200 | 231 |
| 24 | 24 | 57 | 95 | 106 | 154 | 175 | 201 | 232 |
| 25 | 25 | 58 | 64 | 107 | 155 | 176 | 202 | 233 |
| 26 | 26 | 59 | 65 | 108 | 156 | 177 | 203 | 234 |
| 27 | 27 | 60 | 66 | 109 | 157 | 178 | 204 | 235 |
| 28 | 28 | 61 | 67 | 110 | 158 | 179 | 205 | 236 |
| 29 | 29 | 62 | 68 | 111 | 159 | 180 | 206 | 237 |
| 30 | 30 | 63 | 69 | 112 | 128 | 181 | 207 | 238 |
| 31 | 31 | 32 | 70 | 113 | 129 | 182 | 208 | 239 |

Table 4 shows the frequency gaps between each bin to which data bits are assigned.

TABLE 4

Frequency spacing of bit allocation for 8 way frequency diversity

| Bit Number | Bin Number | | | | | | |
|---|---|---|---|---|---|---|---|
| 0 | 33 | 38 | 43 | 16 | 53 | 26 | 31 |
| 1 | 33 | 38 | 43 | 16 | 53 | 26 | 31 |
| 2 | 33 | 38 | 43 | 16 | 53 | 26 | 31 |
| 3 | 33 | 38 | 43 | 16 | 53 | 26 | 31 |
| 4 | 33 | 38 | 43 | 16 | 53 | 26 | 31 |
| 5 | 33 | 38 | 43 | 16 | 53 | 26 | 31 |
| 6 | 33 | 38 | 43 | 16 | 53 | 26 | 31 |
| 7 | 33 | 38 | 43 | 16 | 53 | 26 | 31 |
| 8 | 33 | 38 | 43 | 16 | 53 | 26 | 31 |
| 9 | 33 | 38 | 43 | 16 | 21 | 58 | 31 |
| 10 | 33 | 38 | 43 | 16 | 21 | 58 | 31 |
| 11 | 33 | 38 | 43 | 16 | 21 | 58 | 31 |
| 12 | 33 | 38 | 43 | 16 | 21 | 58 | 31 |
| 13 | 33 | 38 | 43 | 16 | 21 | 58 | 31 |
| 14 | 33 | 38 | 11 | 48 | 21 | 58 | 31 |
| 15 | 33 | 38 | 11 | 48 | 21 | 26 | 63 |
| 16 | 33 | 38 | 11 | 48 | 21 | 26 | 31 |
| 17 | 33 | 38 | 11 | 48 | 21 | 26 | 31 |
| 18 | 33 | 38 | 11 | 48 | 21 | 26 | 31 |
| 19 | 33 | 38 | 11 | 48 | 21 | 26 | 31 |
| 20 | 33 | 38 | 11 | 48 | 21 | 26 | 31 |
| 21 | 33 | 38 | 11 | 48 | 21 | 26 | 31 |
| 22 | 33 | 38 | 11 | 48 | 21 | 26 | 31 |
| 23 | 33 | 38 | 11 | 48 | 21 | 26 | 31 |
| 24 | 33 | 38 | 11 | 48 | 21 | 26 | 31 |
| 25 | 33 | 6 | 43 | 48 | 21 | 26 | 31 |
| 26 | 33 | 6 | 43 | 48 | 21 | 26 | 31 |
| 27 | 33 | 6 | 43 | 48 | 21 | 26 | 31 |
| 28 | 33 | 6 | 43 | 48 | 21 | 26 | 31 |
| 29 | 33 | 6 | 43 | 48 | 21 | 26 | 31 |
| 30 | 33 | 6 | 43 | 16 | 53 | 26 | 31 |
| 31 | 1 | 38 | 43 | 16 | 53 | 26 | 31 |

Shown here are 8 groups each of 32 bins and therefore frequency gaps are limited to the range of 1 to 63.

Diversity 4 pattern is designed in much the same way using this code

```
% Matlab Code to generate bin assignment table
% 4 way diversity
bins=256; % number of carriers in OFDM
bitspersym=64; % number of bits per OFDM symbol
r=4; % redundancy factor, number of bins each bit occupies
dif=16; % stepping increment
a=bitspersym*(0:r−1); % generate boundaries for each group of bins
b=0:dif:dif*2; % generate gap between positions
p=ones(bitspersym, r); % create matrix to hold bin positions
for i=0:bitspersym−1; % loop number of bits
    c=[i i+cumsum(b)]; % actual positions by cumulative sum b
``` d=rem(c,bitspersym); % modulus wraps numbers within group range
p(i+1, :)=d+a; % add group boundaries to bin position
% p is resulting array of bin assignments for each bit end The parameter dif is a stepping increment used when creating the gaps between bit assignments and is set to 16 in this example. This is a variable value and operates as a seed number used to give a particular sequence of bin assignments. The parameter dif can be assigned any value.

In practice, it may be easier to draw the right bit from memory based on the current bin. In other words, an index running across all bins will choose based on a table the right bit from memory.

Table 7 shows such a table for diversity 16 and is derived from Table 1.

While the table is shown as a two dimensional array of numbers for convenience, the table represents the assignment of bits to consecutively numbered bin starting in the upper left of the table and ending in the lower right of the table. Row one shows the bit assignments for carriers 0 to 15, row 2 shows the bit assignments for carriers 16 to 31, and so on.

TABLE 7

Bit assigned to bin numbers in symbol

| 0 | 1 | 2 | 3 | 4 | 5 | 6 | 7 | 8 | 9 | 10 | 11 | 12 | 13 | 14 | 15 |
|---|---|---|---|---|---|---|---|---|---|----|----|----|----|----|----|
| 15 | 0 | 1 | 2 | 3 | 4 | 5 | 6 | 7 | 8 | 9 | 10 | 11 | 12 | 13 | 14 |
| 13 | 14 | 15 | 0 | 1 | 2 | 3 | 4 | 5 | 6 | 7 | 8 | 9 | 10 | 11 | 12 |
| 10 | 11 | 12 | 13 | 14 | 15 | 0 | 1 | 2 | 3 | 4 | 5 | 6 | 7 | 8 | 9 |
| 6 | 7 | 8 | 9 | 10 | 11 | 12 | 13 | 14 | 15 | 0 | 1 | 2 | 3 | 4 | 5 |
| 1 | 2 | 3 | 4 | 5 | 6 | 7 | 8 | 9 | 10 | 11 | 12 | 13 | 14 | 15 | 0 |
| 11 | 12 | 13 | 14 | 15 | 0 | 1 | 2 | 3 | 4 | 5 | 6 | 7 | 8 | 9 | 10 |
| 4 | 5 | 6 | 7 | 8 | 9 | 10 | 11 | 12 | 13 | 14 | 15 | 0 | 1 | 2 | 3 |
| 12 | 13 | 14 | 15 | 0 | 1 | 2 | 3 | 4 | 5 | 6 | 7 | 8 | 9 | 10 | 11 |
| 3 | 4 | 5 | 6 | 7 | 8 | 9 | 10 | 11 | 12 | 13 | 14 | 15 | 0 | 1 | 2 |
| 9 | 10 | 11 | 12 | 13 | 14 | 15 | 0 | 1 | 2 | 3 | 4 | 5 | 6 | 7 | 8 |
| 14 | 15 | 0 | 1 | 2 | 3 | 4 | 5 | 6 | 7 | 8 | 9 | 10 | 11 | 12 | 13 |
| 2 | 3 | 4 | 5 | 6 | 7 | 8 | 9 | 10 | 11 | 12 | 13 | 14 | 15 | 0 | 1 |
| 5 | 6 | 7 | 8 | 9 | 10 | 11 | 12 | 13 | 14 | 15 | 0 | 1 | 2 | 3 | 4 |
| 7 | 8 | 9 | 10 | 11 | 12 | 13 | 14 | 15 | 0 | 1 | 2 | 3 | 4 | 5 | 6 |
| 8 | 9 | 10 | 11 | 12 | 13 | 14 | 15 | 0 | 1 | 2 | 3 | 4 | 5 | 6 | 7 |

This table assumes that the index is running from one end of the spectrum to the other end covering all 256 bins. In reality, it may be more convenient to start at DC proceed towards the positive end of the spectrum, on to the most negative and back to DC as is done in a regular FFT. All that is required therefore is to start reading from the middle point of the table.

In addition, not all 256 bins may be used and the table can thus be shortened to contain only the required number of bins.

In much the same way tables can be generated for diversity 8 and 4.

The receiver uses the redundancy created by frequency diversity of the transmitted signal by summing or combining together all carriers modulated with the same information bit. The summation of carrier signals can be done on hard bit decisions or soft amplitude quantizing. One example of summing all carriers is to use a weighted sum of carriers, with the weighting determined by SNR of each carrier. In this example, SNR can be quantized in 3 dB increments which allows a shifting operation to function as a multiplier. Alternatively, the receiver can select a single carrier with the highest signal to noise ratio from all carriers modulated with the same information bit. Maximal ratio combining can be used to combine the received values. The receiver is programmed with the same allocation tables as the transmitter in order to combine energy from several received bins that carry the same bit of data.

Once the channel conditions are known, other techniques can be used to improve the data throughput in the channel. Examples include bit loading and message preamble optimization.

Figure 3:
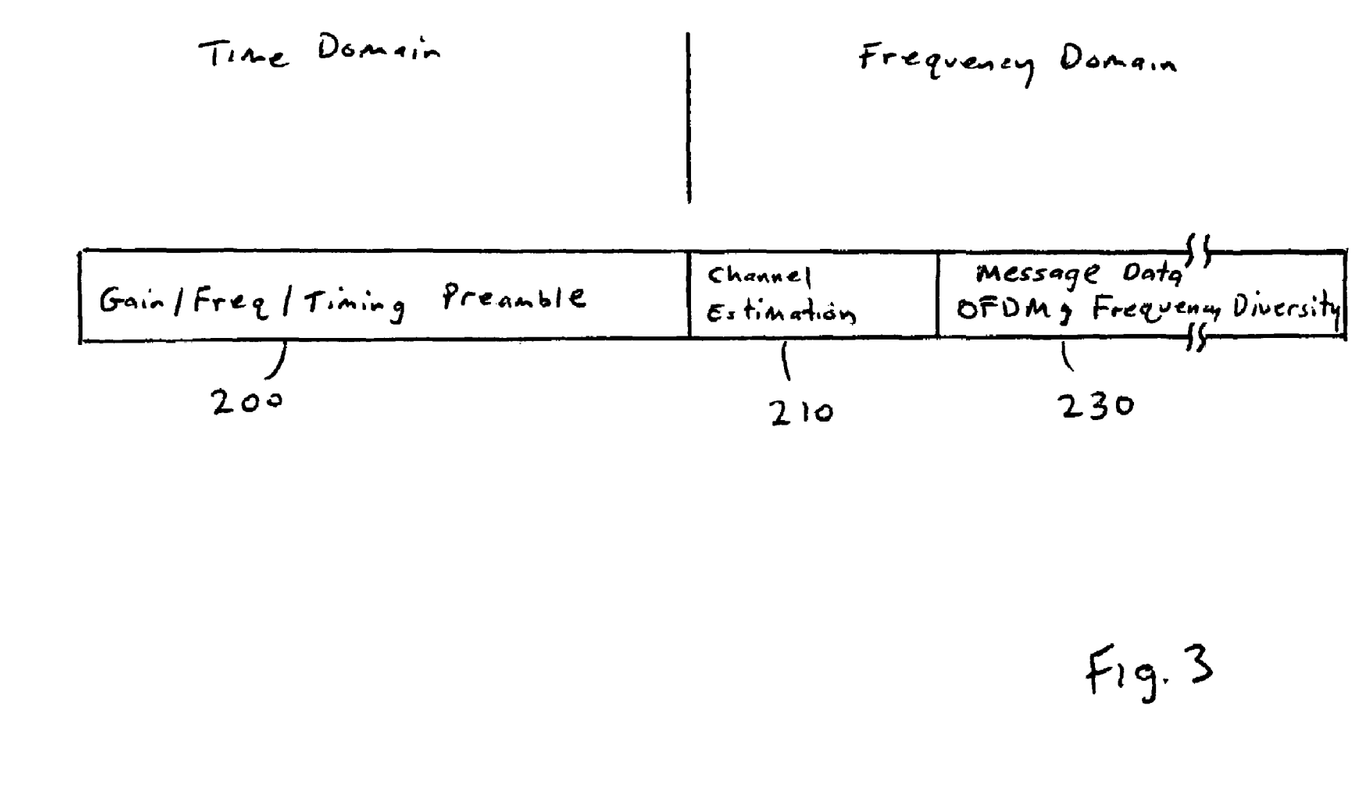
FIG. 3 shows an example message structure using frequency diversity in a portion of the message.

FIG. 3 show an example message structure including frequency diversity in a portion of the message. Preamble 200 can be transmitted as a time domain signal using BPSK or QPSK modulation. The data bit patterns of the preamble enable the receiver to determine gain, carrier frequency offset, and symbol timing. Channel estimation 210 sequence can be transmitted in the frequency domain as a series of OFDM symbols that allows the receiver to determine the SNR in each frequency bin. Message data 230 is transmitted as a series of OFDM symbols using frequency diversity according to the present invention.

Figure 4:
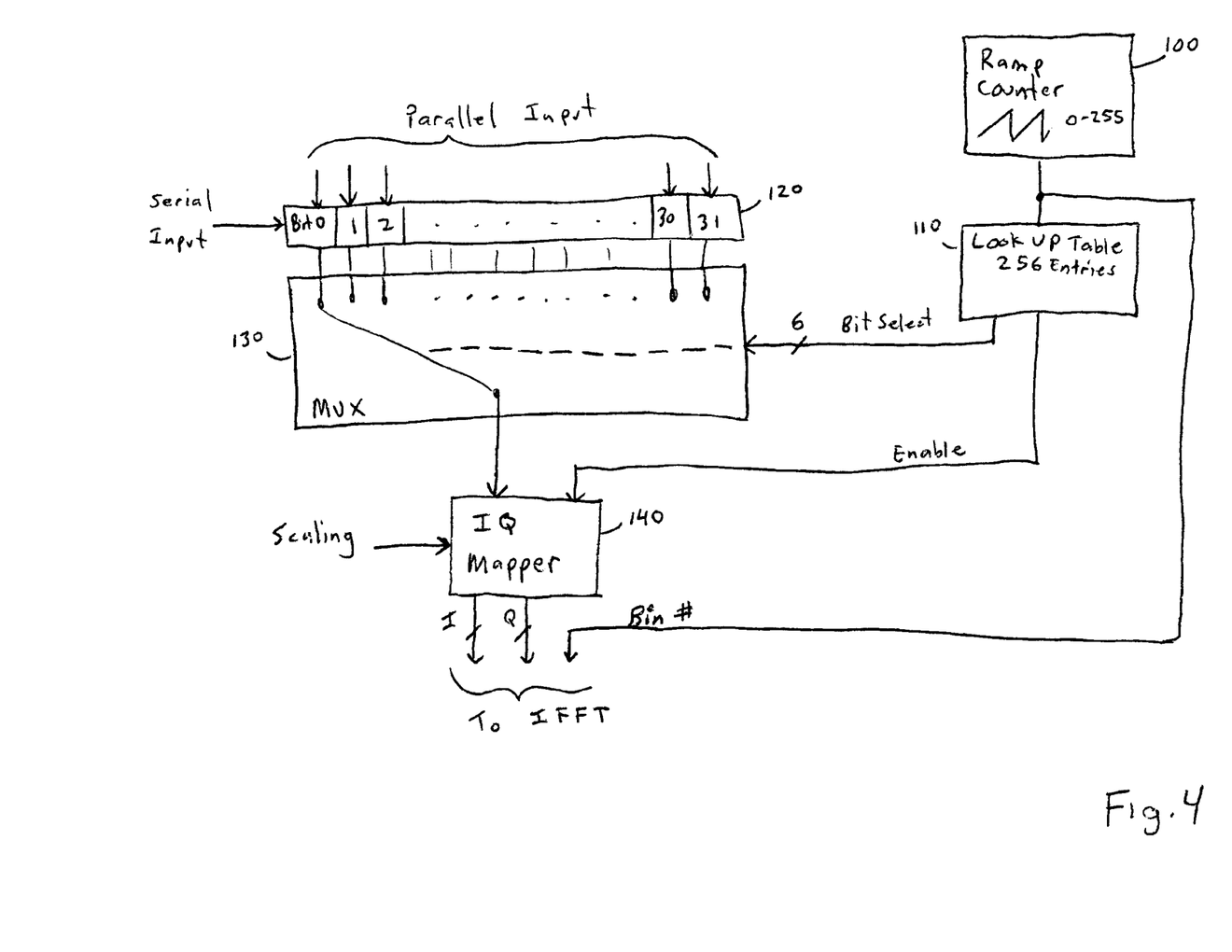
FIG. 4 shows a block diagram of an example circuit to assign and load data bits into bin locations.

FIG. 4 shows a block diagram of an example circuit to assign and load data bits into bin locations. In this example, 32 data bits are assigned to bins forming a 256 carrier OFDM symbol to produce 8 way frequency diversity. Data bits fields and OFDM symbols of other sizes could be used. Data bits are applied to register 120, either in serially or in parallel. Register 120 holds the data bits while the process of assignment to an OFDM symbol takes place. Ramp counter 100 generates a sequential binary count from 0 to 255. Look up table 110 contains the bin allocation information, for example embodying the information contained in Table 7. Look up table 110 maps the bin number input to two output parameters: a bit select value and an enable signal. The bit select value addresses mux/data selector 120 to select one bit from register 120. Data selector 120 is shown selecting single binary values, but could alternatively selects 2 or more bits at a time for use with QPSK or higher order modulation. The selected bit and the enable bit is applied to IQ mapper 140. IQ mapper 140 maps the digital value of the data bit to an N-bit quantized amplitude level, for example +1 and −1 for a BPSK or QPSK signal. The amplitude level could be mapped to +3, +1, −1, −3 in the case of 16 QAM modulation. The enable bit selectively disables the generation of any I or Q value for a particular bin, which has the effect of zeroing the transmitted energy for the corresponding carrier. The I and Q amplitude values along with the bin number is input to an inverse fast Fourier transform (IFFT) engine to produce the symbol sequence transmitted. A scaling input to IQ mapper 140 is multiplied by the nominal I and Q levels and allows scaling of the I and Q amplitude values to fit the input range of the IFFT engine.

Look up table 100 can be implemented with a memory array or combinatorial logic to produce the mapping of input bin numbers to bit select values.

Some bins and the associated carrier may be zeroed to avoid interference resulting from the transmitted signal. Due to the zeroing of certain bins, the actual diversity may be less than the nominal diversity. for example, a nominal 16 way diversity symbol may have some bits repeated in only 15 bins or fewer bins if on or more bins used for a particular bit are disabled.

In one embodiment of the invention, the table of assignment of bits to carriers changes for each OFDM symbol in a predictable sequence. A series of tables can be accessed to produce the different assignments. The assignments can be changed by rearranging the bit number rows as shown in Table 1, or producing a new table by changing the parameters of the generating algorithm.

What is claimed is:

1. An OFDM modulator for transmitting a binary data word in a symbol having frequency diversity comprising:
   a ramp counter for producing a series of bin number values;
   a look up table for mapping the bin number values to bit select values, the look up table comprising entries that produce an assignment of bits to carriers, the assignment resulting in bits being repeated over a selection of carriers that have a non-uniform, pseudorandom pattern for distribution over a set of available frequencies upon which the carriers are transmitted.

2. The OFDM modulator of claim 1 further comprising means for disabling I and Q carrier amplitudes for a particular carrier and zeroing the transmitted energy for that carrier.

* * * * *